United States Patent
Pi et al.

(10) Patent No.: US 11,193,674 B2
(45) Date of Patent: Dec. 7, 2021

(54) MOBILE RECIRCULATION GRILL WITH PLENUM AND DIFFUSER

(71) Applicant: ANH Innovation, LLC, Novi, MI (US)

(72) Inventors: Ming H Pi, Brighton, MI (US); Drake Kern, Walled Lake, MI (US); Daniel Pi, Walled Lake, MI (US)

(73) Assignee: ANH Innovation, LLC, Novi, MI (US)

( * ) Notice: Subject to any disclaimer, the term of this patent is extended or adjusted under 35 U.S.C. 154(b) by 0 days.

(21) Appl. No.: 16/987,885

(22) Filed: Aug. 7, 2020

(65) Prior Publication Data

US 2021/0041110 A1 Feb. 11, 2021

Related U.S. Application Data

(60) Provisional application No. 62/884,014, filed on Aug. 7, 2019.

(51) Int. Cl.
*F24C 15/10* (2006.01)
*F24C 15/32* (2006.01)
(Continued)

(52) U.S. Cl.
CPC ............ *F24C 15/101* (2013.01); *A23B 4/052* (2013.01); *A47J 37/0754* (2013.01);
(Continued)

(58) Field of Classification Search
CPC ..... A47J 37/0754; F24C 15/14; F24C 15/101; F24C 15/322
See application file for complete search history.

(56) References Cited

U.S. PATENT DOCUMENTS 2,341,245 A * 2/1944 Sonntag .................. F24C 15/20
126/299 D
4,350,504 A 9/1982 Diachuk
(Continued)

FOREIGN PATENT DOCUMENTS

FR 2635852 A1 * 3/1990 ............ F24C 15/101

OTHER PUBLICATIONS

Merged Abstract + Patent for Bae.*
International Search Report and Written Opinion, PCTUS2020/045416, Blaine R. Copenheaver, dated Nov. 3, 2020.

*Primary Examiner* — Steven B McAllister
*Assistant Examiner* — Aaron H Heyamoto
(74) *Attorney, Agent, or Firm* — Loomis, Ewert, Parsley, Davis & Gotting P.C.; Mikhail Murshak

(57) ABSTRACT

A recirculation grill that includes a cooktop supported by a stationary frame. The grill includes an intake aperture defining a plurality of slats configured for receiving smoke from the cooktop; a waste tray compartment connected to the trough for receiving waste and grease and having a drawer for removing and cleaning; an interior plenum configured to create a vacuum force to pull air and smoke from the cooktop into the intake aperture; a diffuser positioned over the trash compartment and extending downwardly and outwardly; a tunnel configured to receive air flow from the plenum; and a blower housing enclosing a blower fan configured for pulling air and smoke from the cooktop into the intake aperture and through the plenum. The intake aperture, the plenum, and the blower are configured to achieve 100% visible smoke capture.

19 Claims, 11 Drawing Sheets

(51) Int. Cl.
  *A23B 4/052* (2006.01)
  *A47J 37/07* (2006.01)
  *F24C 15/14* (2006.01)
  *F24C 15/20* (2006.01)

(52) U.S. Cl.
  CPC ............ *A47J 37/0786* (2013.01); *F24C 15/14* (2013.01); *F24C 15/2021* (2013.01); *F24C 15/2035* (2013.01); *F24C 15/322* (2013.01)

(56) References Cited

U.S. PATENT DOCUMENTS

| | | | |
|---|---|---|---|
| 4,610,705 A | 9/1986 | Sarnosky et al. | |
| 4,909,137 A * | 3/1990 | Brugnoli | A47J 37/0682 126/41 R |
| 4,921,509 A | 5/1990 | Maclin | |
| 5,042,456 A | 8/1991 | Cote | |
| 5,063,906 A | 11/1991 | Rogers et al. | |
| 5,133,786 A | 7/1992 | Anderson | |
| 5,154,161 A | 10/1992 | Rogers et al. | |
| 5,251,608 A | 10/1993 | Cote | |
| 5,799,645 A * | 9/1998 | Strader | A47J 37/0786 126/39 R |
| 5,846,302 A * | 12/1998 | Putro | B03C 3/66 96/66 |
| 5,941,235 A | 8/1999 | Carter | |
| 6,097,000 A * | 8/2000 | Frasnetti | F24C 15/006 219/395 |
| 7,092,988 B1 | 8/2006 | Bogatin et al. | |
| 7,470,298 B2 | 12/2008 | Berling et al. | |
| 7,493,362 B2 | 2/2009 | Bogatin et al. | |
| 7,687,748 B2 | 3/2010 | Gagas | |
| 7,699,051 B2 | 4/2010 | Gagas et al. | |
| 8,224,892 B2 | 7/2012 | Bogatin et al. | |
| 8,277,530 B2 | 10/2012 | Alexander et al. | |
| 8,378,265 B2 | 2/2013 | Greewood et al. | |
| 8,522,770 B2 | 9/2013 | Colburn et al. | |
| 8,652,241 B2 | 2/2014 | Alexander et al. | |
| 8,851,064 B2 | 10/2014 | Bruckbauer | |
| 8,852,307 B2 | 10/2014 | Sikkenga et al. | |
| 8,872,077 B2 | 10/2014 | Gagas et al. | |
| 8,940,082 B2 | 1/2015 | Eich et al. | |
| 9,029,287 B2 | 5/2015 | Arndt et al. | |
| 9,074,776 B2 | 7/2015 | Greenwood et al. | |
| 9,121,616 B1 | 9/2015 | Woodall, II | |
| 9,182,131 B1 | 11/2015 | Prasser et al. | |
| 9,205,411 B2 | 12/2015 | Arndt et al. | |
| 9,222,680 B1 | 12/2015 | Woodall, III et al. | |
| 9,327,224 B2 | 5/2016 | Ajemian | |
| 9,335,058 B2 | 5/2016 | Colburn et al. | |
| 9,346,037 B2 | 5/2016 | Arndt et al. | |
| 9,395,091 B2 | 7/2016 | Zank et al. | |
| 9,726,381 B1 | 8/2017 | Prasser et al. | |
| 9,746,188 B2 | 8/2017 | Worrell | |
| 9,835,339 B2 | 12/2017 | Min | |
| 9,869,474 B2 | 1/2018 | McEvoy | |
| 9,897,328 B2 | 2/2018 | McEvoy | |
| 9,903,598 B2 | 2/2018 | Greenwood et al. | |
| 2003/0150198 A1 | 8/2003 | Illingworth et al. | |
| 2003/0167741 A1 | 9/2003 | Illingworth et al. | |
| 2004/0139709 A1 | 7/2004 | Illingworth et al. | |
| 2004/0139710 A1 | 7/2004 | Illingworth et al. | |
| 2006/0150965 A1 | 7/2006 | Kim et al. | |
| 2007/0023420 A1 * | 2/2007 | Gagas | H05B 6/1263 219/623 |
| 2007/0062513 A1 | 3/2007 | Gagas | |
| 2007/0245703 A1 | 10/2007 | Randinelli et al. | |
| 2008/0067167 A1 * | 3/2008 | Sung | F24C 15/101 219/448.17 |
| 2010/0051011 A1 | 3/2010 | Shaffer | |
| 2010/0071327 A1 | 3/2010 | Alexander et al. | |
| 2011/0021128 A1 | 1/2011 | Livchak et al. | |
| 2011/0146657 A1 | 6/2011 | Briedis et al. | |
| 2011/0214664 A1 | 9/2011 | Wubker | |
| 2011/0232481 A1 * | 9/2011 | Worrilow | B01D 46/521 95/10 |
| 2011/0232625 A1 | 9/2011 | Corleoni et al. | |
| 2012/0204855 A1 | 8/2012 | Huber | |
| 2014/0290641 A1 * | 10/2014 | Worrell | F24C 15/2042 126/299 D |
| 2016/0236129 A1 | 8/2016 | Ajemian | |
| 2016/0296870 A1 | 10/2016 | Mckechnie, IV et al. | |
| 2016/0326224 A1 | 12/2016 | Alexander et al. | |
| 2018/0016012 A1 | 1/2018 | Burd et al. | |
| 2018/0016018 A1 | 1/2018 | Burd et al. | |
| 2018/0128495 A1 | 5/2018 | Worrell | |
| 2018/0149368 A1 | 5/2018 | McEvoy | |
| 2018/0229173 A1 * | 8/2018 | Weinbrenner | F24C 15/2021 |

* cited by examiner

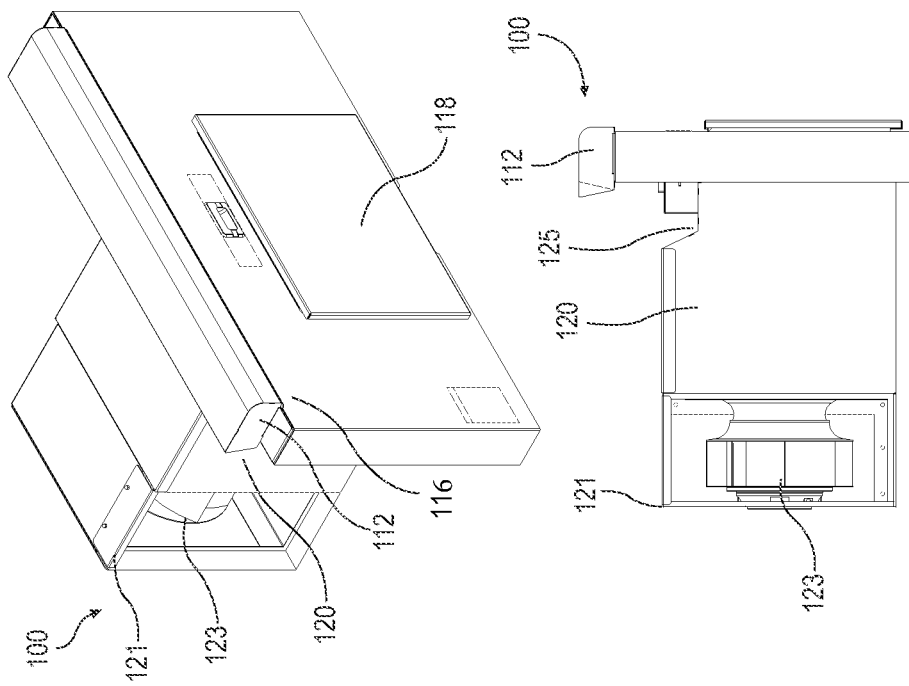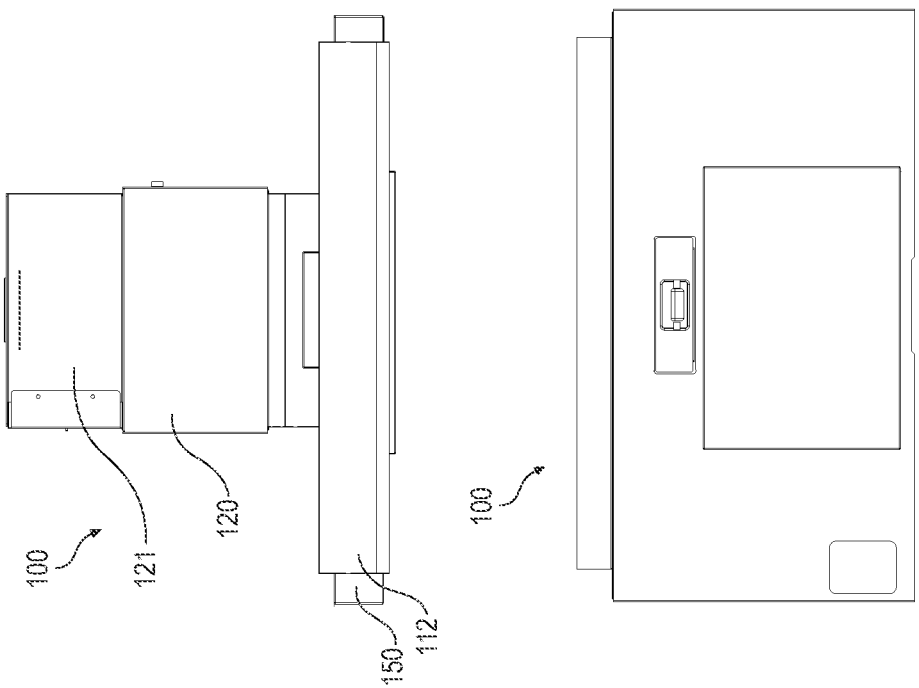

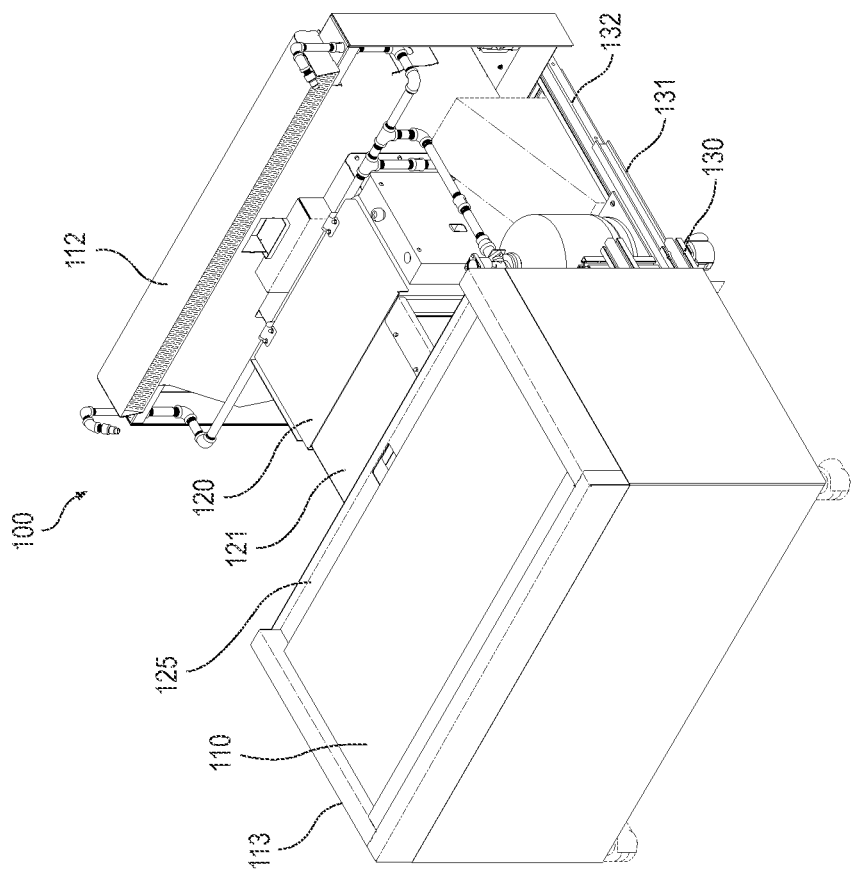
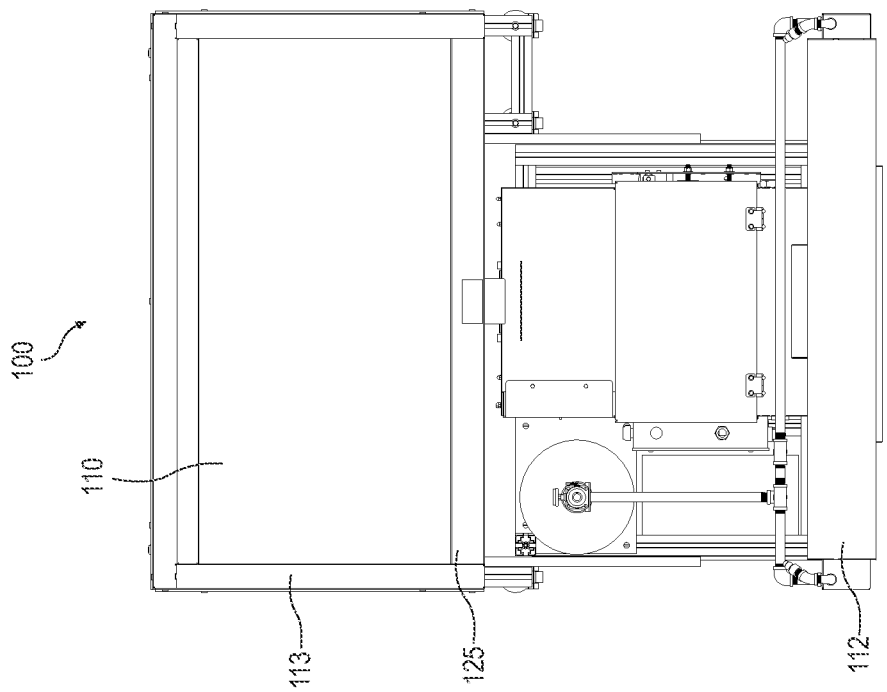
FIG. 4B
FIG. 4A

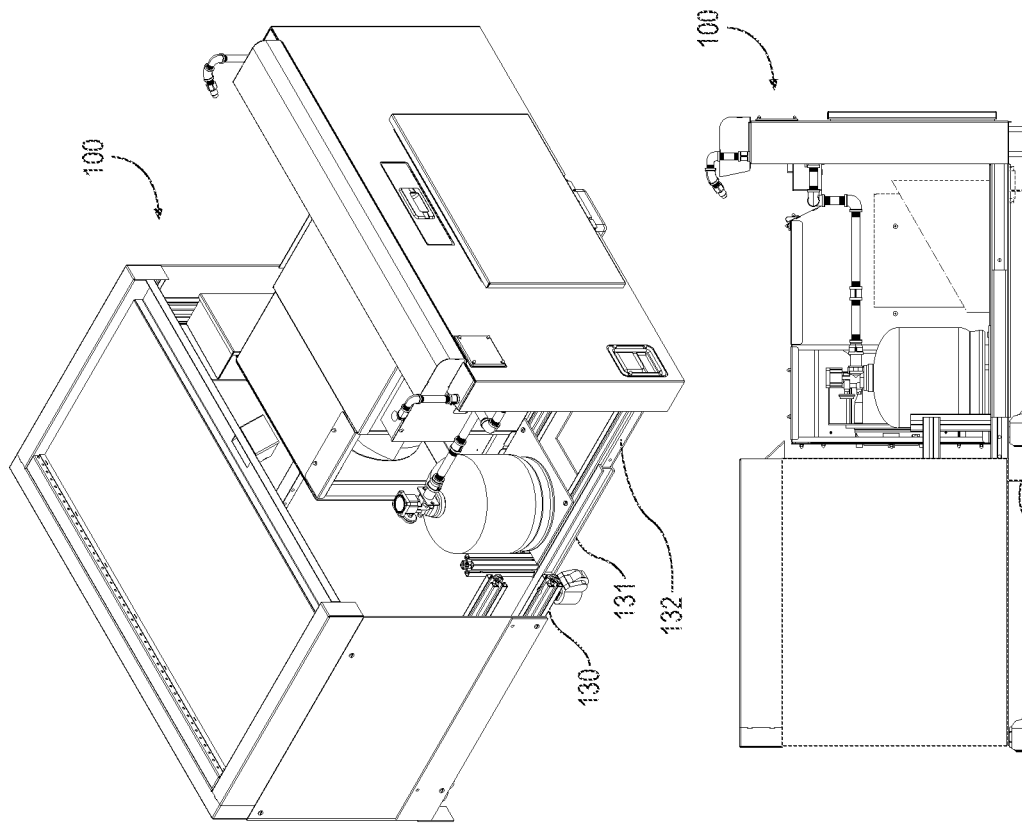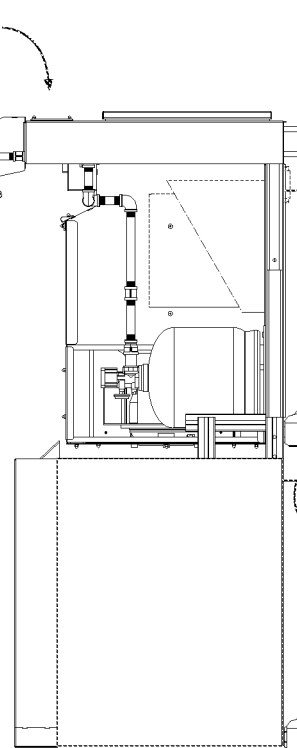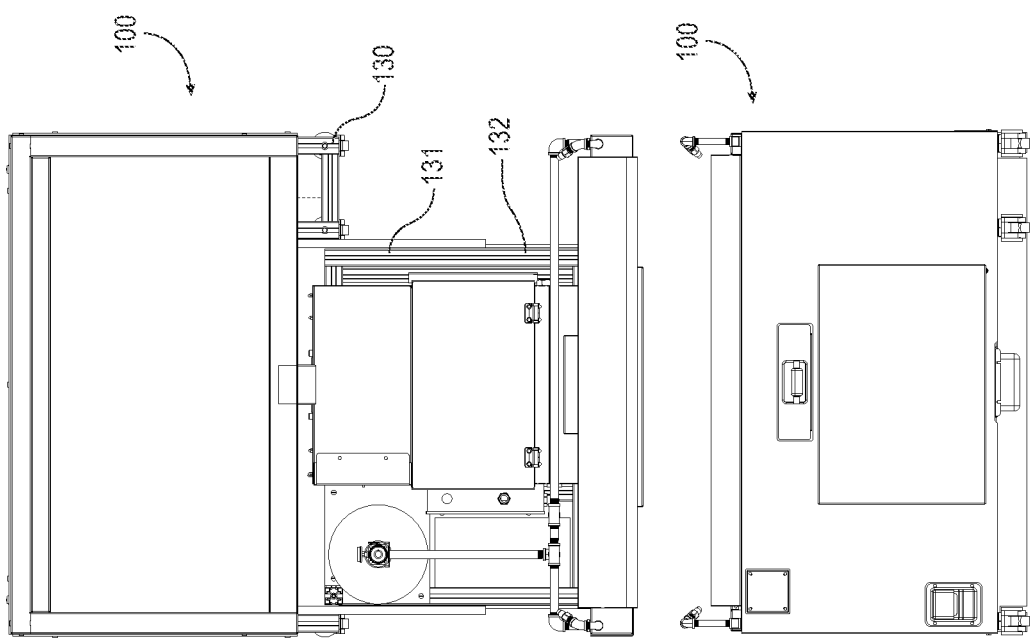

MOBILE RECIRCULATION GRILL WITH PLENUM AND DIFFUSER

CROSS REFERENCE TO RELATED APPLICATION

This application claims priority to U.S. Provisional Application No. 62/884,014 filed Aug. 7, 2019, which is hereby incorporated herein by reference in its entirety.

TECHNICAL FIELD

The present disclosure relates generally to the field of indoor grills and cook tables and in particular, recirculation grills/tables.

DESCRIPTION OF RELATED ART

Indoor grilling for restaurants and private use is known in the art. Cooking food generates smoke. Traditionally, indoor cooking with either electric or gas as a power source requires ventilation of the smoke. This often means installation of expensive, stationary, and robust ventilation systems like fume hoods and the like. The use of fume hoods is a major burden on a heating ventilation and air conditioning (HVAC) system. These overhead hoods must be physically placed directly over a cooking surface and despite their physical position, they still fail to achieve significant smoke capture. As a result, exposure to smells and inhalation of the resulting smoke is common for those in the vicinity of these systems. This also causes odor pollution. The need for proper ventilation further limits the flexibility, innovation and design of a corresponding grill or cooking surface.

In traditional Japanese steakhouses or Teppanyaki restaurants, the grills occupy a significant amount of surface area of a given floor space. The grills are fixed and stationary in order to accommodate the corresponding overhead ventilation hood system. This restricts a restaurant's ability to be creative and accommodate a variety of styles, seating arrangements, and overall design. Moreover, if the ventilation is not perfect, customers often complain of odor contamination and penetration of their clothes thereby ruining the dining experience. These indoor grills are difficult to clean and maneuver since many of the structural components are fixed to satisfy fire and safety code requirements.

Indoor recirculation grills are known. These grills and cooktops are designed in a way that does not require an overhead ventilation and hood system. However, the safety certification required to operate these grills commercially is typically governed by UL and/or ETL standards. The UL/ETL certification requires 100% capture of smoke along with fire safety response and electronic and mechanical shutdown. This can be difficult to achieve when the size of a cooking unit is reduced.

Despite other attempts to solve the problems associated with existing grills, none of these teach or suggest a material and/or method having the benefits and features of the present disclosure.

SUMMARY

The present disclosure provides for a recirculation grill including: (a) a cooktop supported by a stationary frame; (b) an intake aperture defining a plurality of slats configured for receiving smoke from the cooktop; (c) a waste tray compartment connected to the trough for receiving waste and grease and having a drawer for removing and cleaning; (d) an interior plenum configured to create a vacuum force to pull air and smoke from the cooktop into the intake aperture; (e) a diffuser positioned over the trash compartment and extending downwardly and outwardly; (f) a tunnel configured to receive airflow from the plenum; and (g) a blower housing enclosing a blower fan configured for pulling air and smoke from the cooktop into the intake aperture and through the plenum. The intake aperture, the plenum, and the blower can be configured to achieve 100% visible smoke capture. The plenum forms an open space configured to allow airflow to expand, cool, and direct airflow from the intake aperture to the tunnel. In an example, the plenum defines segmented side walls with downward ramp sections configured to collect grease at a bottom section of the plenum. The plenum can be configured to allow at least 18 inches of distance from the cook surface before contacting a first filter.

In an example, the diffuser is configured to direct airflow in two opposite outward directions. The diffuser can include a center horizontal section positioned between two opposed downwardly ramped sections extending away from the center section towards an outer plenum wall and down at an angle configured to direct airflow away and down within the plenum. In another example, the diffuser includes vertical end sections connected to the opposed ramped sections configured to direct airflow down to a lower section of the plenum. The diffuser can be formed of metal such as stainless steel. In yet another example, the plenum is configured to allow large grease particles in the air entering through the intake aperture to condense and drop out of the air and form along the plenum walls, and wherein the plenum walls are angled towards a grease trap positioned at a bottom section of the grill.

The present disclosure provides for a grill wherein the plenum walls are curved. The plenum is configured to form an upper and lower air compartment configured to form a vacuum effect at the intake aperture. The intake aperture can be configured to form enough surface area to ensure 100% visible smoke capture. The trash compartment is positioned through the plenum and the diffuser forms a top portion of the trash compartment. The trough is an elongated trough extending most or all of the length of the cooktop and is positioned below the intake aperture.

The present disclosure provides for a recirculation grill that further includes a push air duct coupled to a push air blower and a push air aperture operable for trapping visible smoke from an opposite side of the cooktop over the cooktop and directing it to the intake aperture. In an example, the tunnel housing can include a wool baffle filter and a combination disposable filter having a minimum efficiency reporting value (MERV) filter and a carbon filter. The blower fan can be configured for adjusting velocity in response to a variable fan drive and control process, wherein the blower is configured to pull air and smoke from the cooktop into the intake aperture and through the plenum.

The present disclosure further provides for a recirculation grill that includes a mobile platform for supporting the blower housing and tunnel operable for slidably engaging with a stationary frame that supports the cooktop, wherein the mobile and stationary frames are modular frames formed of modular frame segments. The grill can further include a controller coupled to heating elements, the blower fan, a plurality of airflow and temperature sensors positioned within the plenum and tunnel, and a safety system. The controller is configured to monitor the blower fan and performance of any filters within the tunnel and activate the safety system if certain air velocity or temperature thresholds are surpassed.

For purposes of summarizing the disclosure, certain aspects, advantages, and novel features of the disclosure have been described herein. It is to be understood that not necessarily all such advantages may be achieved in accordance with any one embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and method(s) of use for the present disclosure constructed and operative according to the teachings of the present disclosure.

FIG. 2A illustrates a top view of the recirculation grill of FIGS. 1A-1D without an outer housing exposing a flow tunnel with blower housing and blower fan.

FIG. 2B illustrates a front view of the exposed recirculation grill of FIG. 2A.

FIG. 2C illustrates an isometric perspective view of the exposed recirculation grill of FIG. 2A.

FIG. 2D illustrates a side view of the exposed recirculation grill of FIG. 2A.

FIG. 4A illustrates a top view of a recirculation grill having an elongated trough with interior components exposed and pulled out from a housing via a mobile platform.

FIG. 4B illustrates an isometric perspective view of the exposed recirculation grill of FIG. 4A.

FIG. 6A illustrates a top view of a mobile platform extended for use with a recirculation grill having an outer housing.

FIG. 6B illustrates a front view of the recirculation grill with the mobile platform extended of FIG. 6A.

FIG. 6C illustrates an isometric perspective view of the recirculation grill with the mobile platform extended of FIG. 6A.

FIG. 6D illustrates a side view of the recirculation grill with the mobile platform extended of FIG. 6A.

The various embodiments of the present disclosure will hereinafter be described in conjunction with the appended drawings, wherein like designations denote like elements.

DETAILED DESCRIPTION

Figure 1C:
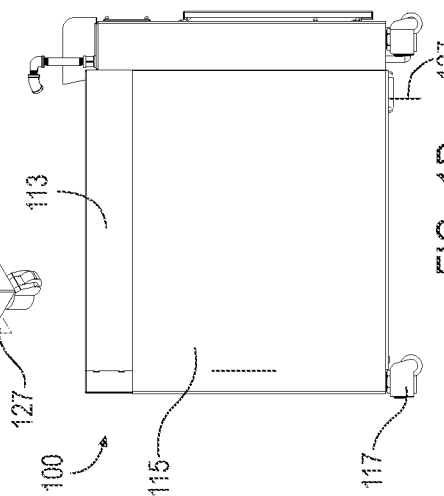
FIG. 1C illustrates an isometric perspective view of the recirculation grill of FIG. 1A.
Figure 1D:
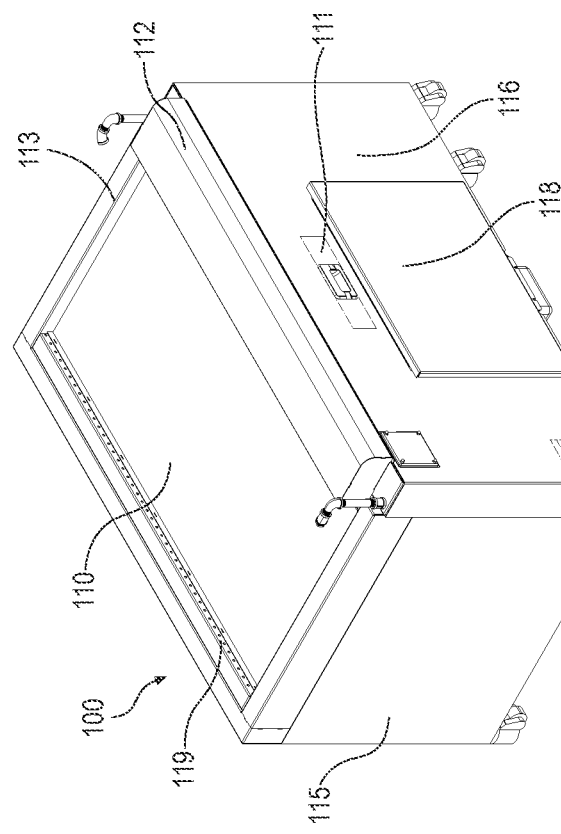
FIG. 1D illustrates a side view of the recirculation grill of FIG. 1A.
Figure 1A:
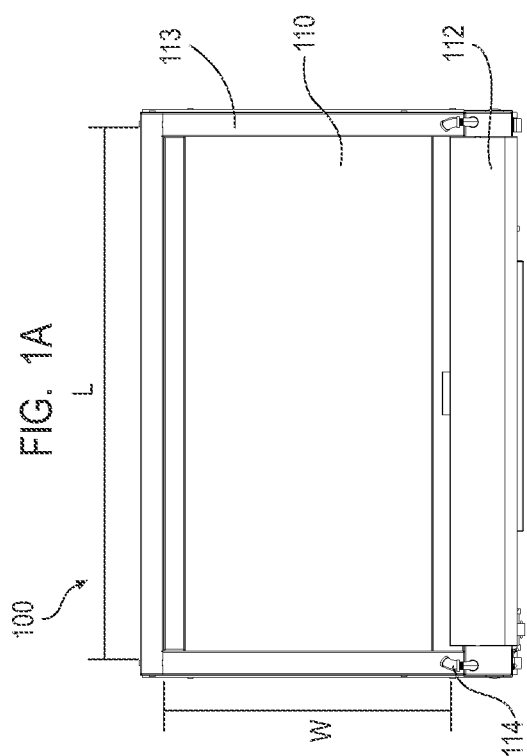
FIG. 1A illustrates a top view of a recirculation grill of the present disclosure with an outer housing.
Figure 1B:
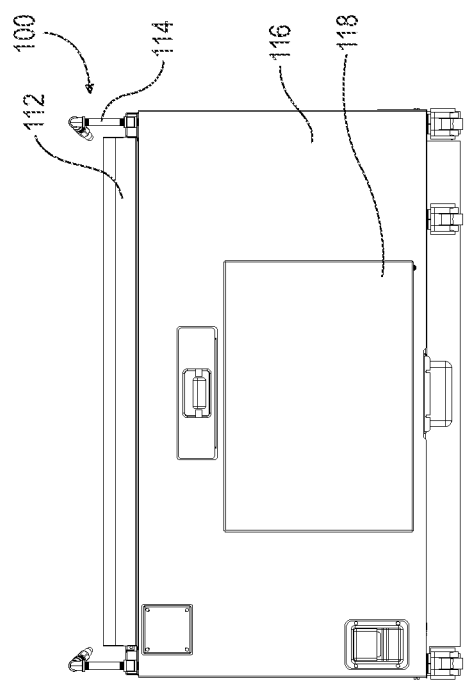
FIG. 1B illustrates a front view of the recirculation grill of FIG. 1A.
Figure 3:
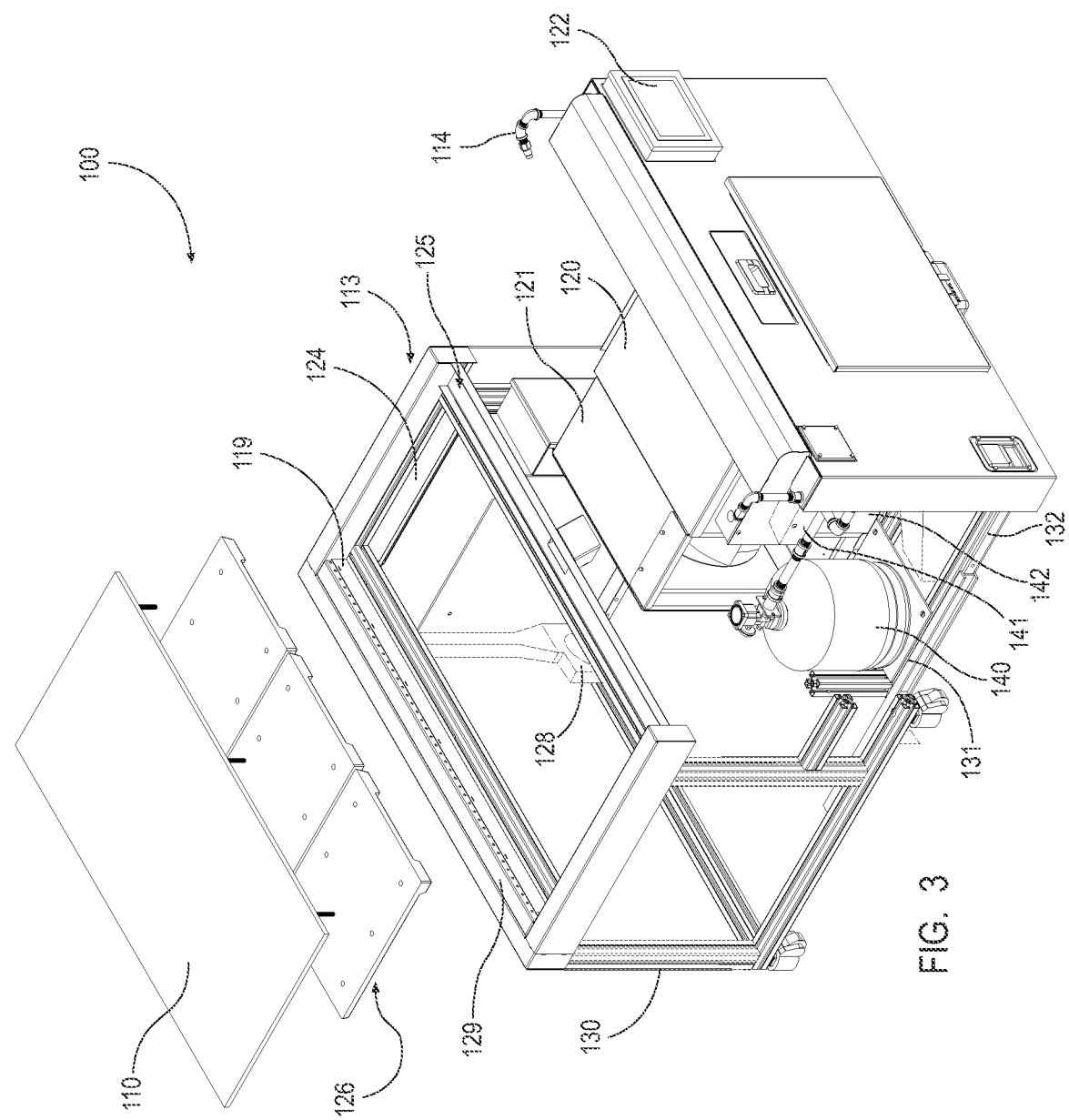
FIG. 3 is an exploded view of a recirculation grill of the present disclosure.

The present disclosure provides for a recirculation grill having at least one or more of the following features: (i) a diffuser and an interior plenum operable for improved airflow into a tunnel and grease control; (ii) a waste trough extending the entire or most of a length of a cooking surface and positioned beneath an aperture; (iii) a mobile platform for maneuvering and improved access to interior components of a cooking unit for cleaning and repair; (iv) a variable fan drive (VFD) for improved efficiency and control of airflow through a filter; and (v) a combination filter operable for improvement of filter waste, cleaning, and replacement. The present disclosure provides for a recirculation grill/table that can be mobile and that satisfies specific requirements in compliance with UL/ETL safety standards. Improvements over prior grills were made that are related to ease of use/maintenance, efficient heating characteristics, and a low level of sound/vibration to not disrupt the dining experience. This included a grill/table that is modular which can be disassembled effectively for shipping and transportation.

The terms "grill" and "table" can be used interchangeably in the industry and throughout the description. Generally, a commercial kitchen or teppanyaki style restaurants will have one or more grills having a flattop cook surface heated by a plurality of electronic or gas-powered burners connected to control knobs for adjusting cooking temperature. The grill/table includes internal components positioned below the cook surface. The grill/table can include an outer housing sized and shaped to protect and conceal internal components. If the grill/table is mobile or provided in the restaurant seating area where customers are within its proximity, additional safety precautions are required.

Referring to FIGS. 1A-7D, an example cooking unit or recirculation grill or table 100 is shown. In this example, grill 100 includes a cooktop 110 positioned relatively flat above an interior portion of the grill. Cooktop 110 can be made from any material sufficient for cooking and ease of cleaning. In this example, the cooktop 110 is fabricated as a single plate made from stainless steel. Cooktop 110 can define a rectangular geometry having a length "L" along a longer side and a width "W" along a shorter side. A user or cook/chef can access and manage cooking of food at a front view position along length L. For a teppanyaki style restaurant where customers are exposed and watching the cooking of their food in close proximity, patrons or customers can sit along a perimeter along the width W and opposite side from the front view. This is often desired as the experience of witnessing the cook work is a significant part of the entertainment and attraction of these restaurants.

Recirculation grill 100 includes interior components that support the cooktop 110 and make possible smoke capture resulting from cooking. As shown in FIG. 1, the grill 100 is enclosed by sidewalls 115 and front face cover 116 and a back wall (not shown) thus forming an outer housing. These walls enclose the interior components for safety and aesthetic purposes and can also serve as a muffler to limit, reduce, eliminate unwanted noise. Positioned along cover 116 is a baffle filter door 118 that is removable to allow access to tunnel 120 which houses one or more filters. In an example, an optional controller 122 is positioned along cover 116 that allows a user control over heating of cooktop 110, turning the grill 100 on and off, and providing basic diagnostic data which is viewable on a corresponding screen. In an example, the controller 122 includes touch screen control and compatibility along with a digital display. In a further example, controller 122 can be programmable and include artificial intelligence and smart adaptability to adjust for specific uses to extend or improve grill efficiency and performance. This can include adjusting for hot zones associated with the cook surface and environmental conditions along with degradation of certain components.

The interior components of grill 100 include a tunnel 120 and a blower housing 121. The tunnel 120 serves as a filter housing for holding filters operable to filter smoke and airflow that is pulled from cooktop 110. As food is cooked on cooktop 110, smoke and exhaust are pushed by air that is pushed through push air duct 119 and pulled through an intake aperture 112. The smoke/air generated during use of grill 100 is contaminated with grease and food particles and must be filtered before released back out of grill 100. Tunnel 120 encloses filters which often include a baffle filter and secondary filters (See FIGS. 9-11). Push air duct 119 is connected to a push air blower 128, which directly pushes air out of the push air aperture 129. Push blower 128 generates low speed air that is pushed across the cooktop towards intake aperture 112. This forms an air curtain over the cooktop 110. The air curtain in combination with a pull blower within blower housing 121 prevents air contamination and allows for 100% visible smoke capture.

Blower housing 121 encloses a blower fan 123 that pulls air from cooktop 110. The blower must be strong enough to pull air at enough velocity from the cooktop 110 through intake aperture 112, through a plenum 150, into tunnel 120 where the air is filtered before being pulled through blower fan 123 and out of grill 100. This air can be referred to as "recirculated air". The recirculated air is pushed down and out through the floor to exit at the feet of the user. In an example, a louvered vent 127 is positioned towards the front of grill 100 to guide the air out and downward as it exits. In an example, blower fan 123 includes an inlet ring that funnels air into the blower to increase efficiency. The blower fan includes a backwards curved centrifugal fan that creates the airflow needed to capture smoke.

To heat cooktop 110, a plurality of electrical heating elements 126 are positioned directly underneath cooktop 110. In this example, three heating elements 126 are provided to allow for cooking or heating zones on top of cooktop 110. This allows a user a variety of ways to manage cooking food by creating different temperatures across the surface. For example, one zone can be designated for warming rice and vegetables while another zone can be at a much higher heat for cooking meats and fish. The heating elements 126 are electrically coupled to a power source (not shown) for delivering heat to the cooktop 110 and control nobs (not shown) for manually controlling cooking surface temperature. In another example, digital and smart controls are employed. Gas can also be used as a heat source and is within the scope of this disclosure. Fire suppression nozzles 114 are positioned adjacent the intake aperture 112 and pointed towards the cooktop 110. This is a safety measure that releases fire suppression chemicals when triggered by a failsafe safety mechanism. Safety compliance requires the presence and function of nozzles 114 along with corresponding sensors throughout the interior of grill 100. The safety sensors are configured to trigger the nozzles 114 when predetermined temperature and or pressure thresholds are surpassed.

Grill 100 further includes a splash guard 113 positioned along a perimeter of the cooktop 110. This splash guard 113 is configured to reduce and prevent grease and food from falling or being pushed off the cooktop 10. This is especially helpful in a restaurant setting where customers are sitting within close proximity to the cooking surface.

Trough

In an example, grill 100 includes an elongated trough or a "grease" trough 125 which is configured to extend length L of the cooktop 110. In an example, the cooktop 110 is 48 inches along length L and trough 125 extends most of or the entire length L. Trough 125 is formed within an opening along a front face 116. This allows a user to push waste and food through the opening and have it captured within the trough 125. The intake aperture 112 is positioned directly above trough 125 and has openings or slats 152 along a backside to capture smoke and exhaust from the cooking surface. Additional grease and particles trapped in the air that is captured by the aperture 112 can be captured in the trough 125. The waste captured in trough 125 is pushed to a trash compartment 111 which is a drawer that can be opened from the front cover 116 of grill 100. Trash drawer 111 collects food scraps and grease that is pushed into the trough by the user. Trough 125 allows for a shorter cook surface relative to the aperture 112 along width W, thus allowing the air curtain to fully prevent contaminated air from escaping from the cooktop surface. Since trough 125 extends along length L, it is easier for a user to eliminate waste from the cooktop 110. Trough 125 includes a downward ramp that allows waste to flow towards trash drawer 111.

Additional interior components of grill 100 include an electrical box 124 which can be positioned next to blower housing 121 and houses electronic components and power connectors for most or all the electrical parts of grill 100. This includes the blowers, heating elements, controller, and sensors. A fire tank 140 carries fire suppression agent which delivers the agent to the nozzles 114 when triggered through fire piping 141. In this example, the fire tank 140 is positioned on an opposite side of blower housing 121 as compared the electrical box 124. A system release module 142 can also be provided which is a mechanical system that releases fire suppression agent when triggered. Both sensor and mechanical safety mechanisms are required for UL/ETL compliance.

Plenum and Diffuser

Figure 5A:
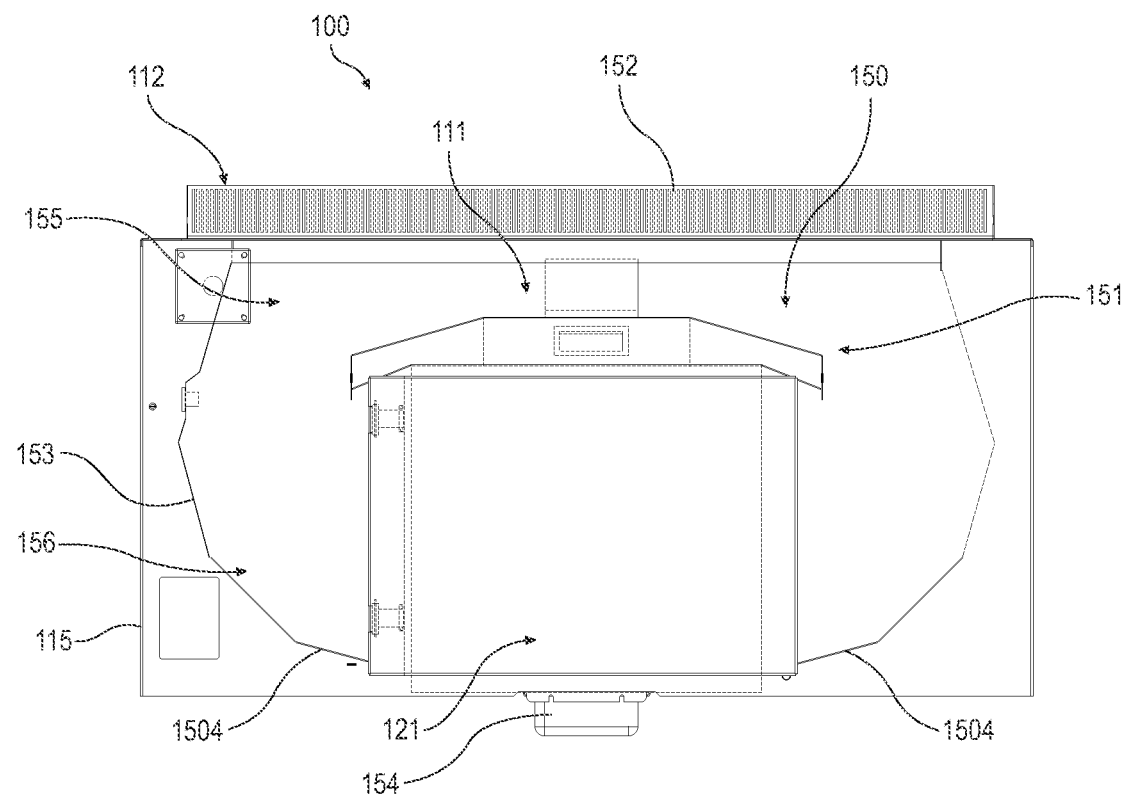
FIG. 5A illustrates a plenum of an interior portion of the recirculation grill of the present disclosure.
Figure 5B:
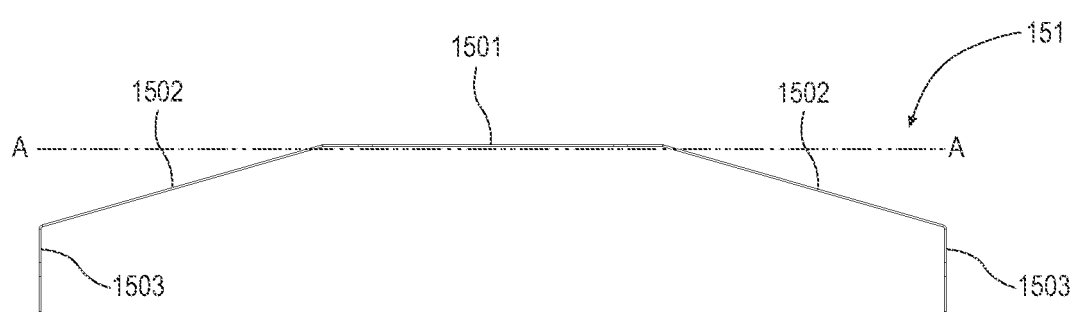
FIG. 5B illustrates a diffuser according to the present disclosure.
Figure 7A:
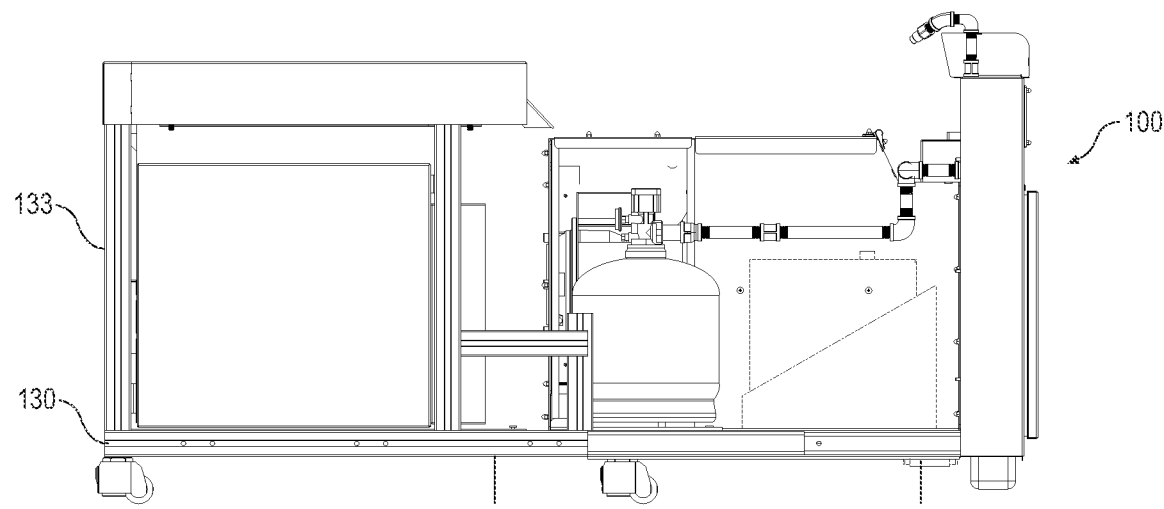
FIG. 7A illustrates an exposed side view of the mobile platform of FIG. 6A having modular frame segments.
Figure 7B:
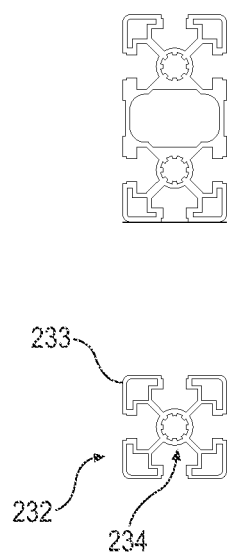
FIG. 7B illustrates connector pieces of the modular frame of the mobile platform of FIG. 7A.
Figure 7C:
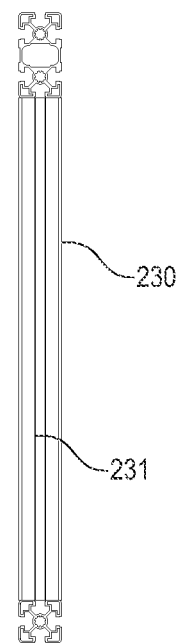
FIG. 7C illustrates a modular bracket of the mobile platform of FIG. 7A.
Figure 7D:
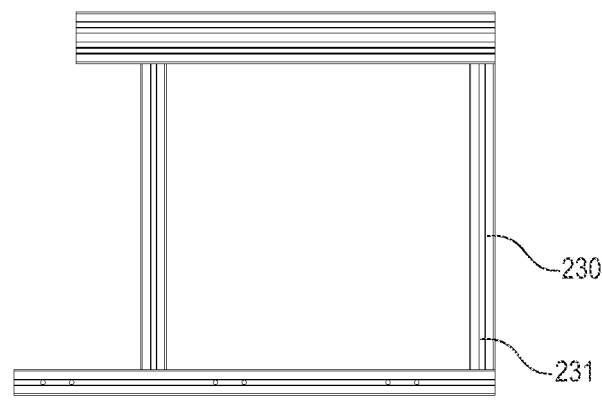
FIG. 7D illustrates an example side view of the modular brackets of FIG. 7A.

With specific attention to FIG. FIGS. 5A and 5B, the present disclosure provides for a plenum 150 which defines an open space structure configured to encourage and promote efficient airflow from the intake aperture 112 to the tunnel 121. The plenum 150 connects the aperture 112 to the tunnel 121. This is the initial route air follows as it is directed towards the filtration system housed by tunnel 121. The plenum utilizes a diffuser 151 to satisfy a safety requirement of 18 inches from the cooking surface (cooktop 110) before contacting a first filter by forcing air to move around the diffuser 151. Diffuser 151 is configured to form a structure that ramps downwardly and outwardly towards plenum walls 153. In this example, the diffuser includes a center section 1501 that relatively flat or horizontal and two opposed ramped sections 1502 that angle down and away from a plane A-A defined by the center section 1501. In an example, the ramped sections 1502 extend towards plenum walls 153 of the outer housing of the table to cause airflow away from the center section 1501. The diffuser can further include vertical end sections 1503 to allow the diffused air to flow down to the lower section of plenum 150.

In an example, the diffuser 151 is formed of metal such as stainless steel such as 304 or 316 or the like. Various sections can be welded together. When in use, air enters through intake aperture 112, hits diffuser 151, which splits the air to move away in at least two different directions along sections 1502 towards side walls 115. The physical presence formed by the diffuser 151 forces the air out towards plenum walls 153 before moving down towards tunnel 121. Along the way, as the space volume of the plenum increases, the air is expanding and thus rapidly cooling which forces larger particles to drop from the air prior to being filtered. This serves as a prefiltering of the smoke or whatever gas is recirculated through grill 100. This diffused air must make a sharp turn around the diffuser 151, which causes excess grease to sling to a bottom section of the plenum 150 where it will drain to a grease tray 154. As grease laden air passes through the plenum 150, grease naturally condenses onto the outermost walls 153 due to a cooler temperature of the metal. In an example, a bottom section of plenum 150 is angled downward along drainage sections 1504 of walls 153 to allow gravity to drain the grease particles to grease tray 154.

In this example, the geometry of the plenum walls 153 is segmented showing sharp connection points rather than a smooth curve. Although both are contemplated and within the scope of this disclosure, a segmented curve design provides ease of manufacturing since the segments can be welded together. The plenum walls 153 are configured to direct and encourage airflow and grease down towards the bottom section of plenum 150.

The diffuser 151 effectively forms two air compartments, an upper plenum 155 above the diffuser 151 and a lower plenum 156 below the diffuser 151. These air compartments create a larger ratio of the compartment opening to the cubic volume inside the compartment. A 'vacuum' effect results that is necessary for capture at the intake aperture 112 to generate the air velocity necessary for 100% or near 100% visible smoke capture. The surface area across intake aperture 112 creates an air ratio vs. velocity of the air and the volume of air. This is balanced within the geometry of the plenum sidewalls 153 to ensure 100% visible smoke capture for a given size of the grill 100. Changing the surface area of the intake aperture 112 allows for manipulating the velocity and with volume change by changing the shape of the plenum walls 153, the vacuum effect can be manipulated. As volume size is decreased, velocity increases. However, an increased volume creates more demand on the blower requirement and thus the filters. Accordingly, the balance of the size and shape of the plenum 150 should be optimized to ensure sufficient blower requirements and smoke capture.

The trash drawer 111 positioning should accommodate the space requirement for plenum 150 as the plenum encompasses the entirety of the front portion of the table 100. Accordingly, the trash drawer 111 does not fit directly below the cooktop 110 like existing indoor cook tables. In this example, the trash drawer 11 is placed in the center of the plenum 150, extending through the plenum 150 to reach the underside of the cooktop 110. This utilizes dead space caused by the diffuser 151 to minimize the effect of blocking airflow. In this example, diffuser 151 forms a top portion of drawer 111.

Platform Design

The present disclosure further provides for a mobile platform operable to allow for efficient and effective maneuvering of table 100 and access and cleaning of the internal components. In this example, the mobile platform includes a stationary frame 130 which forms the structure for holding the cooktop 110 and some of the internal components. Stationary frame 130 is formed of modular frame segments 230 that define a mounting slot 231 that extends a length of the frame segment 230. In this example, each modular frame segment 230 defines a relatively square cross section and can be cut to any desired size. In an example, the frame segments 230 are fabricated from aluminum or any material operable for holding table 100 and its components. Stationary frame 130 includes horizontal frame segments 130 and vertical frame segments 133. In this example, the platform further includes wheels 117 which can be caster wheels or the like. The wheels extend down from horizontal frame segments 130 and allow for manual maneuvering of the entire table 100 along a floor or flat surface. This allows for desired mobility of each table 100 unit which improves cleaning, design, access, etc.

Stationary frame 130 serves as a base frame. Mobile frame 131 connects with stationary frame 130 and is operable to slide in and out within stationary frame 130. In a closed configuration as shown in FIG. 1, the mobile frame 131 is entirely positioned within stationary frame 130 and underneath cooktop 110. In an open position, the internal components can be pulled out from the outer housing and exposed, like FIGS. 3, 4A, 4B, 6A, 6C, 6D, and 7A. In these examples, the mobile frame 131 slides out and extends to allow access to internal components. Mobile frame 131 supports ductwork for the fire system, the tunnel, and the blower housing. In another example, the electrical box is further positioned on the mobile frame 131. Mobile frame 131 can be constructed of the modular frame segments 230 just like stationary frame 130. In this example, mobile frame 131 further connects to a sliding drawer 132 that allows for moving the mobile frame 131 to slide in and out of a guiding track.

Each frame segment 230 can be capped at each end by a connector piece 232. In this example, connector 232 forms four protrusions 233 that define a channel 234 there between. The channel 234 allows the connector 232 to mount and connect to any other modular frame segment 232 by engaging channel 231. Accordingly, a plurality of frame structures can be formed and designed for mounting and holding a table 100 and any corresponding components. This allows for improved customization and design.

In an example, the platform design consists of two parts: the mobile platform 131, and the stationary frame 130. The mobile platform 131 is attached to the stationary frame 130 by slides on either side of the table 100 along width W. When slidably separated, the stationary frame 130 supports the cooktop 110, heating elements 126, the electrical box 124, thermocouples, junction box, and push air assembly 128. The mobile platform 131 supports the blower 123, tunnel assembly 120, and fire system components 140/141/142. In another example, the electrical box is supported with the mobile frame. With the table 100 open, access to a top portion of the tunnel 120 is easily achievable for filter access and replacement. Moreover, the right and left side of the mobile platform, where the electrical box 124 and fire system components 140, 141, and 142 sit respectively, and underneath the cooktop 110 for heating element 126, maintenance is also made easier and more accessible.

Platform design allows for improved access to the internal components for cleaning, filter replacement, and maintenance. Due to the 710b safety requirement for a minimum of 18" and the requirement for the height of the table, filters must be at almost ground level. To reach this area to clean or replace filters would require crawling on the ground. Also due to the need for the space on either side of the tunnel for electrical and fire, there is no easy way to access the tunnel behind these systems without a mobile platform as described herein. Also, fire and electrical systems would need to be accessed from floor level without the mobile platform of the present disclosure. The present disclosure provides for a table that can separate into two sections that allow top access to the filters, electrical and fire systems.

Isolating the electrical box with the stationary frame offers an improved electrical configuration. When the box is stationary, a technician can access most areas of the table without being able to modify or touch the electrical box. This allows for a fixed connection point of the electrical box to the other components or power supply. The electrical box can include two multiplexors that are connected via coil cables. The fire system connection has its own coil cable.

Fire piping, wiring between moving parts, and securement/leveling require optimization when utilizing a mobile platform. For fire piping, the stationary frame is moved further inwards to allow the fire pipe to extend to the plenum and reach the cooktop. This allows the fire system to stay on the mobile platform. The wiring between moving parts was addressed by using curly cables that will form back to a spring like shape when not extended. Leveling is achieved by placing the frame on leveling casters that include both the leg and the wheel. For securement, the platform is attached to the frame via slides that can handle well over the platform weight. This allows the platform to handle unforeseen circumstances where extra weight is added to the platform such as a person leaning on the plenum.

Figure 8A:
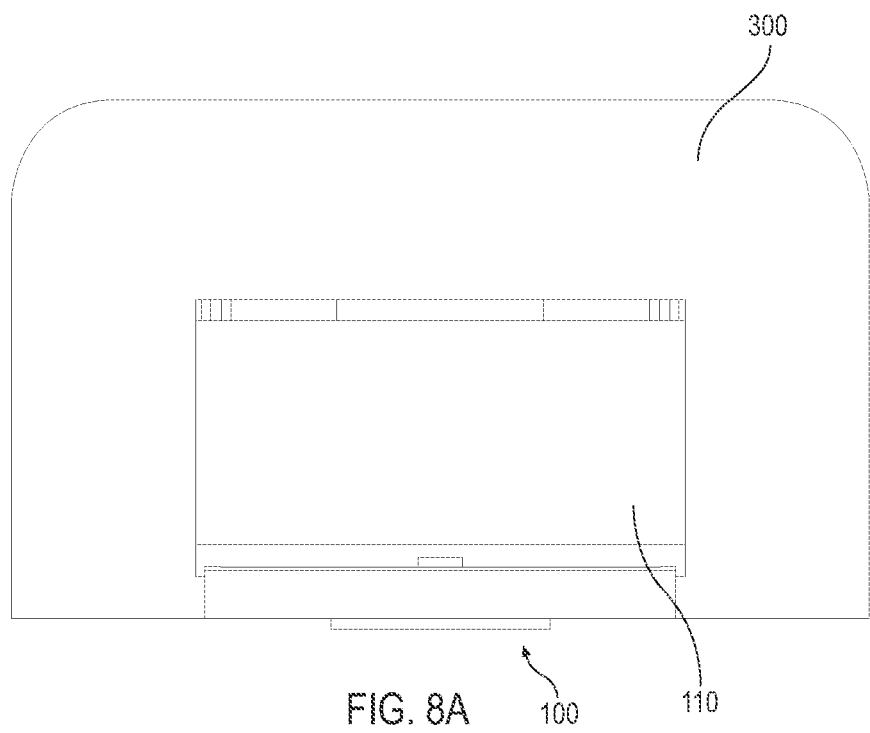
FIG. 8A illustrates a top view dining surface design associated with a recirculation grill of the present disclosure.
Figure 8B:
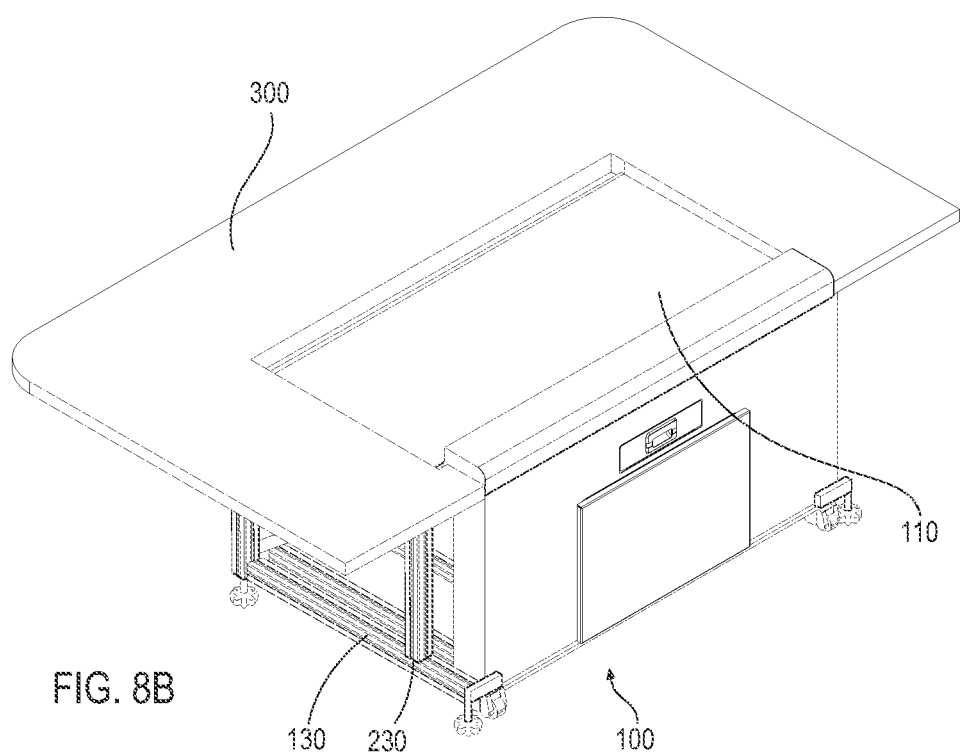
FIG. 8B illustrates an isometric perspective view of the recirculation grill of FIG. 8A.
Figure 9C:
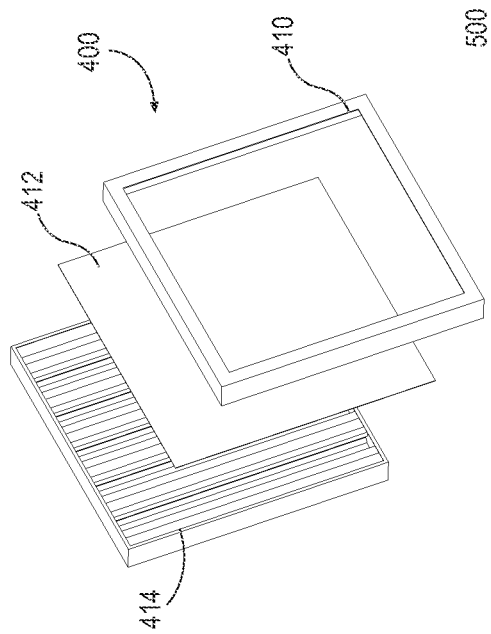
FIG. 9C illustrates an isometric perspective view of the exploded component view of FIG. 9B.
Figure 9B:
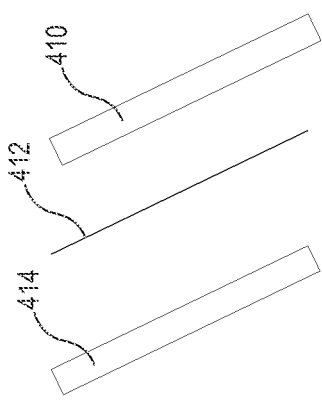
FIG. 9B illustrates an exploded side view of the components of the baffle filter of FIG. 9A.
Figure 9A:
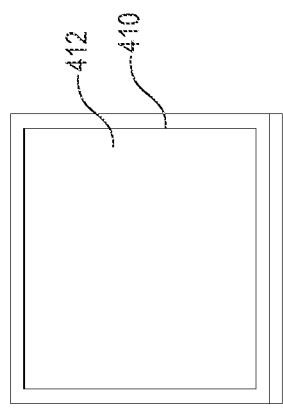
FIG. 9A illustrates a front view of a baffle filter for use with a recirculation grill of the present disclosure.
Figure 9F:
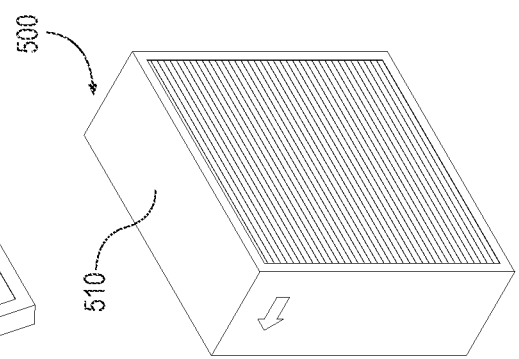
FIG. 9F illustrates an isometric perspective view of the combination filter of FIG. 9D.
Figure 9E:
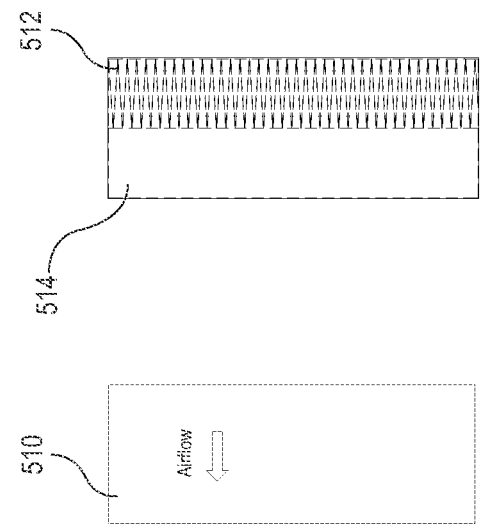
FIG. 9E illustrates a side view of the combination filter of FIG. 9D.
Figure 9D:
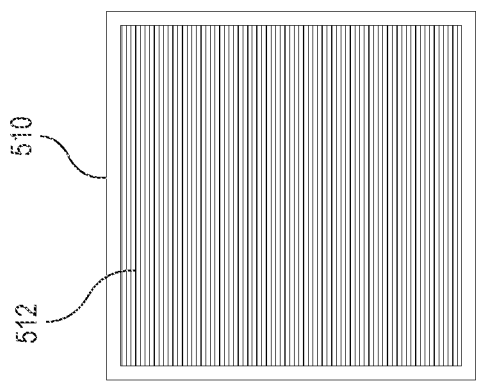
FIG. 9D illustrates a front view of a combination filter for use with a recirculation grill of the present disclosure.

FIG. 8 illustrates an example table 100 having an eating or dining surface 300 surrounding the cooktop 110. Since table 100 is mobile and portable, a variety of dining surface designs can be implemented. In this example, the surface 300 is relatively square. However, other geometries are contemplated and within the scope of this disclosure such as round and rectangle. The dining surface 300 can be mobile to move with the table 100 or fixed to allow the table 100 to move in and out from the surface. It is further contemplated that a variety of materials and designs aesthetics can be implemented for surface 300.

Filtration Design with Variable Fan Drive

Previous models struggle with high cost of ownership since labor costs were incurred to clean an Electro-Static Precipitator (ESP) filter with proper procedures and frequency. The cost of training for employees to maintain and clean these units is relatively high. If improperly handled, the ESP can be easily damaged and caused to malfunction. The present disclosure provides for a grill that uses passive filters. In an example, passive filters include a MERV-style filter like a Merv15 and odor control combination filter (combo filter) and a wool baffle filter. These passive filters are disposable when the grease is fully saturated and it is time replace. In addition, inner compartments that require cleaning have been designed with ease of access to reduce the cleaning time. Using passive filters can increase static pressure compared to using an ESP. However, with a Variable Fan Drive (VFD) (see the flow diagram of FIG. 10) that controls the blower speed, filter lifespan can be increased. In an example, the VFD can monitor up to a 10% change in airflow per UL/ETL standard (unit shuts off if the airflow changes more than 10%). This filter arrangement can provide for a 100% visual capture rate which must be met for the smoke capture, and less than 5 ppm (parts per million) of grease laden vapors measured at the exhaust for the EPA testing. This creates inverse requirements: the lowest air velocity for the proper filtration and the high air speed for capture.

Figure 10:
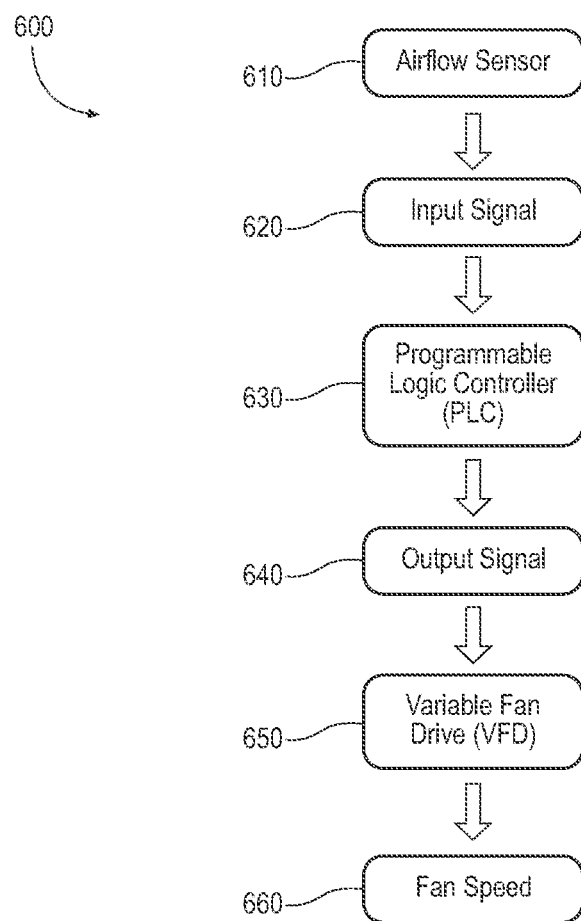
FIG. 10 is a flow chart associated with a variable fan drive ("VFD") for use with a recirculation grill of the present disclosure.
Figure 11A:
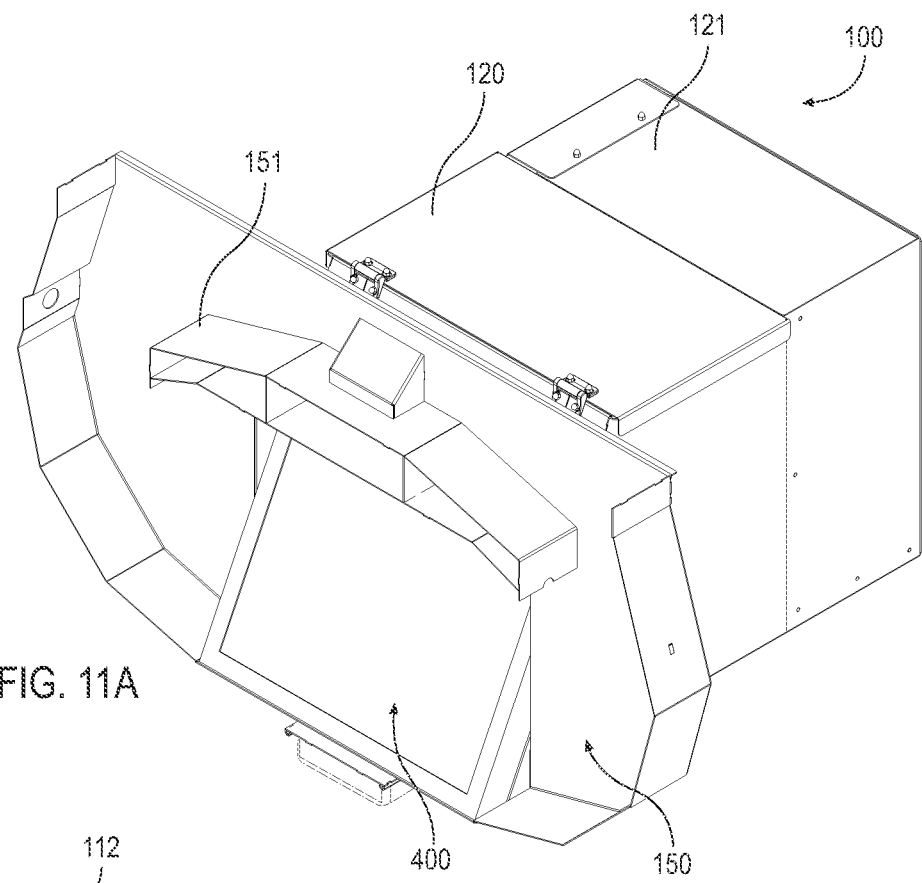
FIG. 11A illustrates an isometric perspective view of a recirculation grill having a baffle filter positioned at an angle within a tunnel of the recirculation grill of the present disclosure.
Figure 11B:
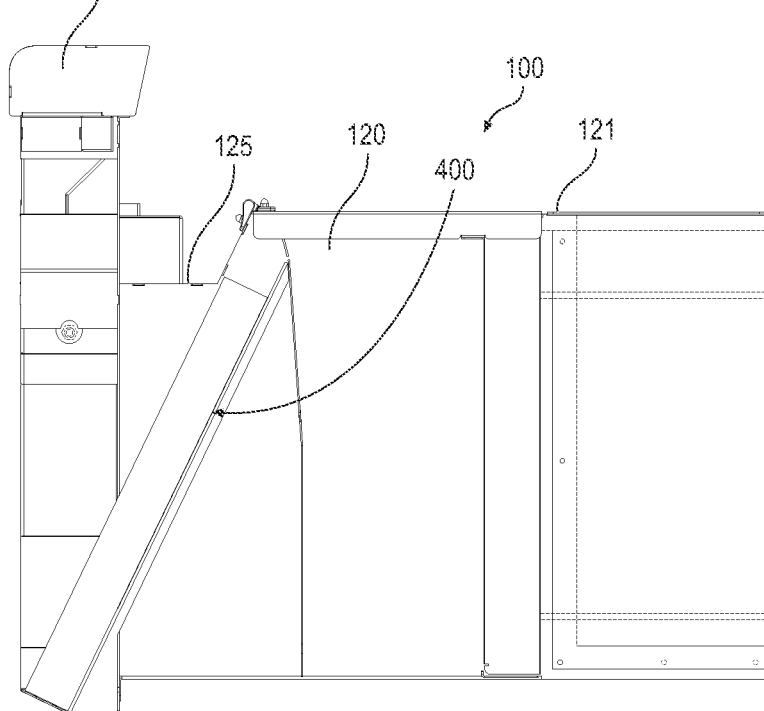
FIG. 11B illustrates a side view of the recirculation grill of FIG. 11A.

Referring to FIGS. 9-11, the present disclosure provides for a combination disposable filter 500. The combination filter works in conjunction with a wool covered baffle filter 400. A variable speed fan is used rather than a constant speed fan to increase the lifespan of the filters. The wool baffle filter 400 includes a frame 410 that holds together a wool insert 412 and a baffle filter 414. Baffle filter 414 can be removed and washed. The wool baffle filter 400 will first catch the large grease particulates making up most of the grease going into the system (table 100). This wool covering 412 on the filter 400 is also disposable and should be replaced as needed. The remaining airborne grease will then collect on the combo filter 500.

Combo filter 500 consists of two different filters 512 and 514 in one package. The first is a MERV filter 512 to collect the physical airborne grease. The second is a carbon filter 514. This carbon filter 514 will adsorb odor producing particulates. Due to 710B requirements, a recirculating unit must shut off if the airflow changes by more than 10% and detection may be needed for every filter. The variable fan drive (VFD) can increase its rpms therefore maintaining the air velocity as the filters get saturated. Due to the nature of MERV filters, as the filter gets saturated, the filtration efficiency increases, so there is no risk of losing capture as the fan speed ramps up. This allows the filters to be used for the entirety of the filter's lifespan rather than needing to be changed due to airflow requirements. To address the detection, the combo filter 500 was specifically designed for user ease and to limit the amount of detection required.

Previous systems utilized an Electro-Static Precipitator or ESP. Issues exist with an ESP related to cleaning and reliability. ESPs should be handled only by professionals for safety as it is a high voltage component. Also, mishandling the ESP frequently causes damage to internal plates/cells. When cells are bent or damaged the ESP will short out the power pack causing the unit to fail. With the frequency the ESP must be cleaned, it is highly likely for damage to occur when not handled by professionals.

Another challenge for filtration involves the space given for the actual filters. The filter efficiency relies on length of time grease laden air is passing through the filter. Two ways to achieve this are to slow down the air or increase the depth of the filter. To accommodate this issue, the airflow is choked and the baffle filter 400 is positioned at an angle (See FIG. 11) within the tunnel 120 to increase the usable depth of the tunnel 120.

FIG. 10 illustrates a flow diagram of a variable fan drive process 600. In this example, the process 600 starts at box 610 where the airflow is measured by an airflow sensor. The airflow sensor generates an input signal at box 620. The input signal at box 620 is then received by a programmable logic controller (PLC) at box 630. This generates an output signal at box 630 which then moves to box 650 to adjust the variable fan drive (VFD). The VFD then drives the fan speed to adjust accordingly at box 660.

Odor elimination and reduction is an issue to be addressed when working with recirculation grills or any indoor restaurant environment. Accordingly, in another example, a finishing filter is provided within the airflow pathway after the air has been cleaned by both the baffle filter and the combination filter. This finishing filter can include a filtering material that defines a relatively large surface area to capture and/or eliminate any remaining odor particles like fatty acids from meats. In another example, the finishing filter is specifically designed to eliminate odors resulting from the cooking of steak/beef, seafood, poultry, vegetables, rice, and cooking oils.

The present disclosure provides for a recirculation grill/table that utilizes a trough 125 to collect grease by draining into an interior of the grill 100. Trough 125 is located right in front of the intake aperture 112, which increases the distance required for smoke capture. Thus, the aperture 112 combats this disadvantage by hanging over the trough 125 to increase the depth of capture. In addition, the airflow can be optimized by adjusting the filter 400/500 makeup to handle an acceptable air speed for capture while balancing the air speed to volume ratio to create a vacuum effect. Adding push air aperture 119 and push air blower 128 on an opposing side of the cooktop 110 from the aperture 112 traps air that results in additional capture and prevents it from escaping away from the table. This causes air entrainment in the direction of the aperture 112 assisting in capture.

Cost reduction of service can also be achieved with grills according to the present disclosure. Previous models did not have indicators to diagnose the technical issues. For instance, an ESP generally malfunctions caused by lack of cleaning. Without proper cleaning, extensive grease/debris is built up on the ESP and creates a path for an electrical short. If correctional action is not taken, the powerpack enters a safety mode and causes the loss of filtration efficiency and smoke capture. The present disclosure incorporates indicators on fuses; highlighted short circuits as well as a smart system that alerts users via a Human Machine Interface (HMI) screen to address specific malfunctions and output instructions.

The present disclosure provides for a grill/table having standard dimensions that fit in line with other units for most kitchens. In an example, a grill/table of the present disclosure fits within standard specifications for a kitchen griddle: 30" (H)×50" (L)×33" (W).

The present disclosure provides for a mobile grill/table with reduced weight and size to allow the unit to be easily moved around and through doors without needing additional labor. The table weight was reduced due to elimination of a mounting plate by using cast aluminum heaters. Further, alternating from mild steel to extruded aluminum can contribute to a significant weight reduction. Extruded aluminum does not only have advantage of weight reduction, but also enables a modular design. The aluminum extrusions and subsystems are removable by bolts for field replacement while not requiring specialized knowledge. Hence, it may reduce the service costs. Additionally, shipping is simplified as frames can be partially assembled.

The present disclosure provides for user-friendly features including the ease of use/maintenance. Unlike a limited Automatic Temperature Controller ("ATC"), the grill of the present disclosure utilizes an advanced HMI (smart) system display that provides diagnostic information to end-users. These messages can alert the user to replace filters, change fuses, or be aware of an active short. It reduces the significant downtime and maintenance cost. Another advantage includes the level of maintenance for cleaning and filter replacement. As aforementioned in the cost of ownership, using passive filters with a VFD eliminates the need to clean the main active filter. As filters clog with grease, the VFD ramps up the speed of blower to a level that maintains proper air speed and capture. This continues until the filter reaches its "end of life cycle" and the HMI notifies the user to replace the filter.

Further, the mobile platform allows for the filtration, aperture, and fire system to be located on a mobile platform, which is housed within the stationary frame holding electrical system, push air, and cooktop. This allows the mobile platform to be rolled out and the filtration tunnel and other essential systems to be easily accessible for the service. For the filter replacement, simple steps of opening the tunnel door, discarding the old filter, and sliding in a new filter can be easily performed. After the safeties are properly locked and the mobile platform resumes to its original position, the unit can turn back on and operate.

Important aspects of a cooking appliance for the restaurant industry are its reliability and efficient heating characteristics including heat-up/recovery speed. Common criticism of electric appliances is that the temperature capability often cannot measure with a gas-powered unit. Reaching and retaining sufficient heating can be a major challenge as available amperage has to be split between cooking and built-in hood systems for the recirculation. In an example, for enhanced heating capacities, the present disclosure provides for a 50-amp table unit so available amperage is increased. In an example, a clad cooktop is provided. Clad cooktops are combinations of aluminum, steel, and other layered metals to promote heat-transfer characteristics. Aluminum has characteristics to increase the heat transfer and reduces the heat recovery time. A casted aluminum heating assembly also covers the most area of the underside cooktop that creates a more even edge-to-edge heating characteristic.

The present disclosure provides for a table with sound and vibration reduction and canceling. For recirculating grills, a higher level of sound and vibration are produced from the motor and airflow because of the blower. A high-pitched whistling noise can result and detected by air leaks/gaps from improper manufacturing process. In an example, the exhaust exits into the grill based on the concept that the increased size of a muffler lowers the pitch. The higher pitch sounds more irritating than the lower of the same decibel level. Since a traditional muffle is not used, the grill is enclosed by a double-walled corrugated panel that muffles the sound produced within the grill. In addition, proper gasket can be used to secure the blower and all moving parts to produce the lowest possible level of the sound and vibration. The interior wall surface of the table effectively serves as a muffle which may affect the exhausted air. With high volumes of exhaust air exiting the grill underneath the frame in any direction, exhausted air is directed to a specific area in order to control turbulence and entrainment. To achieve this, a kickplate is provided around the grill to prevent the air leakage and added louvre panels and diffusers on the plenum to direct the exhaust at a downward angle.

The present disclosure may utilize the following aspects: a mobile platform with a stationary frame, usage of a passive filter in conjunction with a VFD to maintain the lowest possible air speed for capture, utilizing the outer frame itself as a muffler to address sound and space concerns including a trough in front of the aperture in a recirculating system, and placing the baffle filter at an angle.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A recirculation grill comprising:
   (a) a cooktop supported by a stationary frame;
   (b) an intake aperture defining a plurality of slats configured for receiving smoke from the cooktop;
   (c) a waste tray compartment connected to a trough for receiving waste and grease and having a drawer for removing and cleaning;
   (d) an interior plenum configured to create a vacuum force to pull air and smoke from the cooktop into the intake aperture;
   (e) a diffuser positioned over the waste tray compartment and extending downwardly and outwardly toward opposite plenum walls;
   (f) a tunnel configured to receive airflow from the plenum; and
   (g) a blower housing enclosing a blower fan configured for pulling air and smoke from the cooktop into the intake aperture and through the plenum;
   wherein the waste tray compartment is positioned through the plenum and the diffuser forms a top portion of the waste tray compartment.

2. The recirculation grill of claim 1, wherein the plenum forms an open space configured to allow airflow to expand, cool, and direct airflow from the intake aperture to the tunnel.

3. The recirculation grill of claim 1, wherein the plenum defines segmented side walls with downward ramp sections configured to collect grease at a bottom section of the plenum.

4. The recirculation grill of claim 1, wherein the plenum is configured to allow at least 18 inches of distance from the cooktop before contacting a first filter.

5. The recirculation grill of claim 1, wherein the diffuser is configured to split and direct airflow in two opposite outward directions.

6. The recirculation grill of claim 1, wherein the diffuser includes a center horizontal section positioned between two opposed downwardly ramped sections extending away from the center section towards the opposite plenum walls and down at an angle configured to direct airflow away and down within the plenum.

7. The recirculation grill of claim 6, wherein the diffuser includes vertical end sections connected to the opposed ramped sections configured to direct airflow down to a lower section of the plenum.

8. The recirculation grill of claim 1, wherein the diffuser is formed of metal.

9. The recirculation grill of claim 1, wherein the plenum is configured to allow large grease particles in the air entering through the intake aperture to condense and drop out of the air and form along the plenum walls, and wherein the plenum walls are angled towards a grease trap positioned at a bottom section of the grill.

10. The recirculation grill of claim 1, wherein the plenum walls are curved.

11. The recirculation grill of claim 1, wherein the plenum forms an upper and lower air compartment configured to form a vacuum effect at the intake aperture.

12. The recirculation grill of claim 1, wherein the intake aperture, the plenum, and the blower fan, are sized and shaped to achieve 100% visible smoke capture when the blower fan and the grill are in use.

13. The recirculation grill of claim 1, wherein the trough is an elongated trough extending most or all of the length of the cooktop and is positioned below the intake aperture.

14. The recirculation grill of claim 1, further comprising a push air duct coupled to a push air blower and a push air aperture operable for trapping visible smoke from an opposite side of the cooktop over the cooktop and directing it to the intake aperture.

15. The recirculation grill of claim 1, wherein the tunnel housing includes a wool baffle filter and a combination disposable filter having a minimum efficiency reporting value (MERV) filter and a carbon filter.

16. The recirculation grill of claim 1, wherein the blower fan is configured for adjusting velocity in response to a variable fan drive and control process, wherein the blower is configured to pull air and smoke from the cooktop into the intake aperture and through the plenum.

17. The recirculation grill of claim 1, further comprising a mobile platform for supporting the blower housing and tunnel operable for slidably engaging with a stationary frame that supports the cooktop, wherein the mobile and stationary frames are modular frames formed of modular frame segments.

18. The recirculation grill of claim 1, further comprising a controller coupled to heating elements, the blower fan, a plurality of airflow and temperature sensors positioned within the plenum and tunnel, and a safety system.

19. The recirculation grill of claim 18, wherein the controller is configured to monitor the blower fan and performance of any filters within the tunnel and activate the safety system if certain air velocity or temperature thresholds are surpassed.

* * * * *

UNITED STATES PATENT AND TRADEMARK OFFICE
CERTIFICATE OF CORRECTION

| | |
|---|---|
| PATENT NO. | : 11,193,674 B2 |
| APPLICATION NO. | : 16/987885 |
| DATED | : December 7, 2021 |
| INVENTOR(S) | : Pi et al. |

It is certified that error appears in the above-identified patent and that said Letters Patent is hereby corrected as shown below:

On the Title Page

(71) Applicant: ANH Innovation, LLC should be ANH Innovations Inc.

(73) Assignee: ANH Innovation, LLC should be ANH Innovations, Inc.

Signed and Sealed this
Fifteenth Day of August, 2023

Katherine Kelly Vidal
*Director of the United States Patent and Trademark Office*